J. M. CAGE.
INTERNAL COMBUSTION ENGINE.
APPLICATION FILED SEPT. 3, 1918. RENEWED MAY 26, 1921.
1,386,394.
Patented Aug. 2, 1921.
2 SHEETS—SHEET 2.
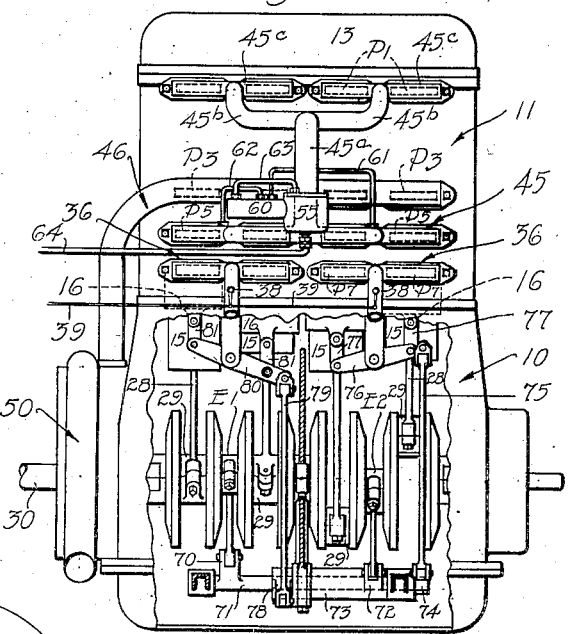
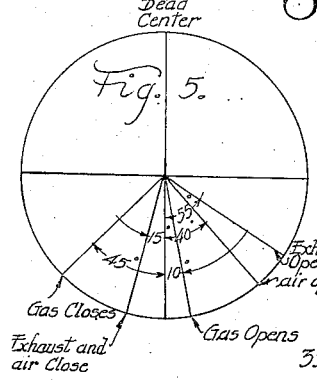
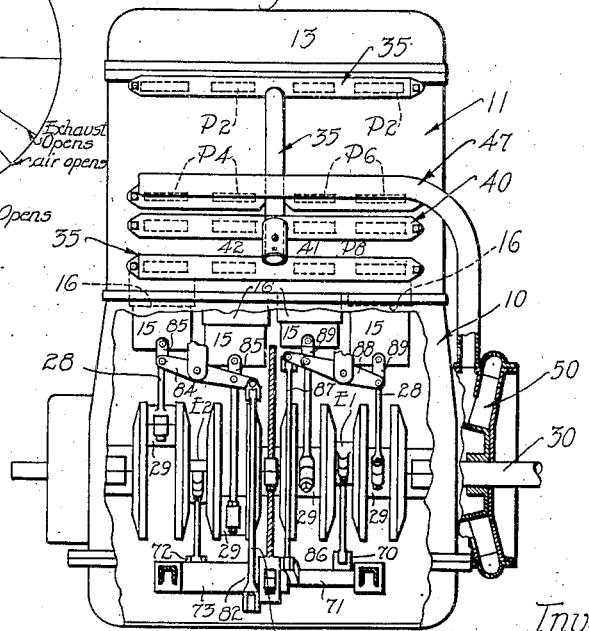

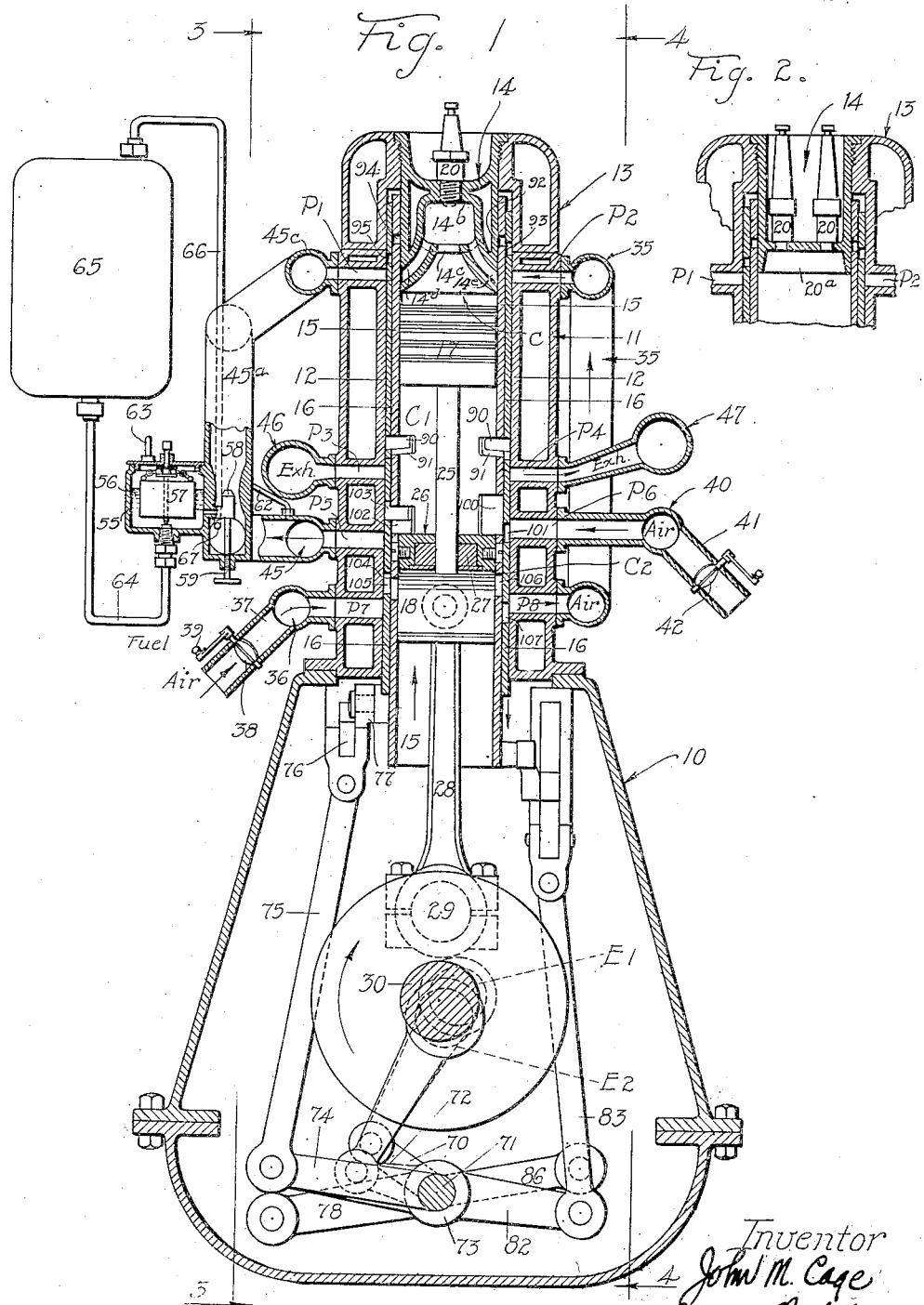

UNITED STATES PATENT OFFICE.

JOHN M. CAGE, OF LONG BEACH, CALIFORNIA, ASSIGNOR TO CAGE ENGINE SYNDICATE, INC., OF NEW YORK, N. Y., A CORPORATION OF DELAWARE.

INTERNAL-COMBUSTION ENGINE.

1,386,394.   Specification of Letters Patent.   Patented Aug. 2, 1921.

Application filed September 3, 1918, Serial No. 252,356. Renewed May 26, 1921. Serial No. 472,884.

*To all whom it may concern:*

Be it known that I, JOHN M. CAGE, a citizen of the United States, residing at Long Beach, in the county of Los Angeles, State of California, have invented new and useful Improvements in Internal-Combustion Engines, of which the following is a specification.

This invention relates to internal combustion engines and particularly to engines of the two cycle type; and the invention relates to improvements in the general construction and organization of such an engine, and in the method of operation of such an engine; and in certain aspects this invention and this application relates to improvements upon the type of engine shown and described in my application Serial No. 84,420, filed March 15, 1916, and my application Serial No. 173,409, filed June 7, 1917. In certain aspects the present application is in part a continuation of said former applications; particularly with reference to the general mode or cycle of operation and the general organization and combination for that mode of operation; and particularly with regard to modes of operation including the feature of stratification of the fuel charge and the feature of packing that charge, or supercharging the combustion chamber. And then in the present application there are certain further features having to do with the general organization and combination of mechanism and with the general mode of operation of the engine.

In a two cycle engine such as herein described I preferably organize, in a single unitary mechanism, a combustion chamber, a scavenging-and-charging-air compression chamber and a charge compressing chamber. With regard to the charge compressing chamber I preferably directly compress the air which is subsequently carbureted under pressure to make a compressed carbureted mixture which is admitted to the combustion chamber. The combined charges of compressed air and carbureted mixture are of greater volume than the swept volume of the combustion chamber and greater than the total volume of the whole combustion chamber; so that the combustion chamber may be super-charged with an explosive mixture, or, according to the peculiar cycle of operation which I utilize, can be supercharged with a stratified charge of air and a combustible mixture. The general cycle of operations which I utilize for this purpose is one of the novelties which is the particular subject matter of this application. In connection with this novel cycle of operations I utilize also a means for independently controlling the proportionate amount of the scavenging and charging air and of the combustible charge, and also means for independently controlling the character of the combustible mixture itself.

Furthermore, in order to accomplish the modes of operations herein set forth I utilize some particular forms of mechanism which in a general way are the particular subject matter of this application; although the more specific forms of mechanism, considered more particularly from the standpoint of mechanical combination and mechanical operation, are the particular subject matter of and claimed in my said co-pending application No. 173,409, filed June 7, 1917.

I shall first describe a typical preferred form of mechanism; and for this purpose I refer to the accompanying drawings in which—

Figure 1 is a vertical cross section of my engine; Fig. 2 is a section showing a modified head construction for the engine; Fig. 3 is a reduced side elevation taken as indicated by line 3—3 of Fig. 1; Fig. 4 is a similar elevation taken as indicated by line 4—4 of Fig. 1; and Fig. 5 is a diagram illustrating the cycle of operation of the engine.

In the drawings the numeral 10 designates a crank case and 11 designates a cylinder block seated upon the crank case, in which block any suitable number, say 4, cylinders 12 may be formed. A head block 13 seats upon the cylinder block and carries the heads 14 which extend down into the working sleeve cylinder 15. This working sleeve cylinder 15 works within another sleeve 16 which may for convenience be termed the valve sleeve. Sleeves 15 and 16 together form the working valve mechanism for the various parts hereinafter described; and the inner sleeve 15 also performs the office of working cylinder for the pistons 17 and 18. Both sleeves 15 and 16 project below into the crank case and are there connected with an operating mechanism which will be hereinafter described. This mechanism reciprocates the sleeves in such a manner, and the ports in the sleeves are so placed, as to effect the cycle of operations hereinafter particularly set forth. Head 14 projects down into the upper end of sleeve 15, and this head may be a plain form of head as shown in Fig. 2, or the chambered head shown in Fig. 1. As shown in Fig. 2 the head may have an upper concavity and a pair of spark plugs 20 may be mounted in that concavity. As shown in Fig. 1 the head 14 may have a chamber $14^b$ into which the spark plug 20 projects and this chamber may have a central restricted opening $14^c$ connected with the combustion chamber C over the piston 17.
A passage port $14^d$ is adapted to direct combustible charge into chamber $14^b$ from cylinder port $P^1$ when the valve ports are in proper registration; and there is also another passage port $14^e$ adapted to direct the scavenging and charging air into $14^b$ from the air port $P^2$ when the sleeve ports are in proper registration. It is the function of this peculiarly designed head to assist the stratification operation, as hereinafter fully set forth; although stratification does not depend upon this particular construction but is fundamentally and primarily caused by the particular mode and cycle of admission of the scavenging and charging air and of the combustible charge.

Pistons 17 and 18 both reciprocate in cylinder sleeve 15 and are inter-connected by piston rod 25 which passes through a head 26 mounted in and carried by the inner cylinder sleeve 15. This head 26 may be provided with suitable packing as indicated at 27 (preferably metallic packing) to keep a tight joint around the piston rod. Lower piston 18 is connected by connecting rod 28 with crank pin 29 of crank shaft 30. The chamber $C^1$ below piston 17 is utilized as a charge compressing chamber while the chamber $C^2$ below head 26 and above piston 18 is utilized as an air compressing chamber. Exhaust ports $P^3$ and $P^4$ are provided in the outer cylinder in such a situation that the upper end of work piston 17 comes to a point somewhat below these exhaust ports when at the lowermost point of its stroke.
Below the exhaust port $P^3$ there is a charge compression port $P^5$ adapted for connection with chamber $C^1$; and on the opposite side of the cylinder block under the exhaust port $P^4$ there is an air intake port $P^6$ adapted for connection with chamber $C^1$. Below port $P^5$ there is a port $P^7$ for inlet of air to chamber $C^2$ and on the opposite side of the cylinder block there is a port $P^8$ through which compressed air is forced by upward movement of piston 18 into a compressed air manifold 35. This compressed air manifold 35 carries the compressed air to the ports $P^2$ previously described.

To the ports $P^7$ a manifold 36 may be connected. In Fig. 3 I show this manifold as being made to serve two cylinders; and each double manifold has an air intake pipe 37 controlled by a valve 38, and the two valves may be operated together by means of rods 39. By this means the inlet of air to the air compressing chamber $C^2$ may be fully controlled, so as to allow each one of those air compressing chambers to compress either a full charge or any fractional proportion thereof. This compressed air is forced into the manifold 35 and delivered to the compressed air ports $P^2$ of the various cylinders. Now it may be said at this point that although I describe my engine in a multi-cylinder form, yet it will be recognized that the fundamental mode of operation and the fundamental mechanism arrangements and the combinations herein described are applicable to a single cylinder organization. In a multi-cylinder organization I find it convenient to control all of the cylinder units by a common control. For instance, I effect the control of air admission to chamber $C^2$ in the manner just described; but that air admission might as well be controlled in the manner that the air inlet to ports $P^6$ is controlled. In this latter case there is a single air manifold 40 serving all the ports $P^6$ and provided with a single air intake pipe 41 controlled by a valve 42. The port $P^6$ delivers air into chamber $C^1$ on the upstroke of piston 17; and this air is compressed and forced out through the port $P^5$ into manifold 45 on the downstroke of piston 17. From this manifold 45 there leads a stand pipe $45^a$ and the upper end of the stand pipe is connected by branches $45^b$ to the upper manifolds $45^c$ which communicate with ports $P^1$. The compressed air passes through stand pipe $45^a$ and is there carbureted while under pressure. The system of carburation, as hereinafter explained, is arranged to operate under the variable pressures raised in manifold 45; and is also arranged to enable independent control of the quality of the mixture to be had at all times; so that not only the quantity but also the quality of the combustible charge delivered to ports $P^1$ may be at all times independently controlled. Exhaust ports $P^3$ and $P^4$ discharge into exhaust manifolds 46 and 47; and these manifolds may connect with a vacuum producing means, such as an exhaust fan indicated at 50 mounted upon crank shaft 30 of the engine. The fan by its operation will keep at all times a somewhat reduced pressure on the exhaust manifolds. This reduced pressure facilitates the quick evacuation of the combustion chamber and particularly may facilitate the scavenging of those chambers and the full charging of them with fresh scavenging air. Furthermore the exhaust fan acts as a muffler in which the flow of exhaust is regulated and made even and the sharp exhaust impulses broken up before delivery to the atmosphere.

In a convenient form of carbureter organization I may locate a float chamber 55 alongside stand pipe 45ª and this float chamber will contain liquid fuel 56 at a level which is regulated by float 57. This liquid fuel will be delivered to fuel nozzle 58 in stand pipe 45ª; and this nozzle may be controlled by needle valve 59 in any ordinary manner. The inner configuration of the stand pipe may be made such as to give effectual carburation to the air passing by the nozzle. Means for doing this are well known and need no particular description here. It will be understood that the pressure in manifold 45 and stand pipe 45ª will vary in accordance with the control of the engine and will also be directly varied by the control of air admission to the combustion chamber $C^1$. In order to make the carbureter operate with uniform efficiency I employ an equalizing system which places the liquid fuel under a surface pressure at all times equal to that in the manifold. In any convenient location I provide a small pressure equalizing reservoir 60. This reservoir may be conveniently supported by attachment to float chamber 55. In the present design the manifold 45 has two branches and from each one of these branches I run a small connecting pipe 61 or 62 to the chamber 60. The chamber 60 thus contains at all times a fairly uniform and steady pressure equal to the average of pulsating pressures in the manifold 45; and from chamber 60 I run a small connecting pipe 63 to the upper part of float chamber 55 to communicate the pressure of chamber 60 to the surface of the liquid fuel in chamber 55. The liquid fuel may preferably be fed to the float chamber through pipe 64 leading from tank 65 somewhat above the carbureter; and a pressure pipe 66 may lead from a point such as 67 on manifold 45 to the upper part of fuel tank 65, thus putting the liquid fuel in that tank under the manifold pressure. The result of this arrangement is that the pressures are equalized at all points in the fuel and carbureter system so that the liquid fuel will flow freely to the carbureter and carburation of the compressed air will take place freely and uniformly without interference by the variable pressure.

I shall now proceed to describe generally the valve mechanism of the engine, sufficiently to make the valve operation clearly understood. This valve mechanism is substantially similar to the valve mechanism explained in my co-pending application Serial No. 173,408, filed June 7, 1917, and so will need no particularly detailed explanation here. There are two eccentrics $E^1$ and $E^2$ on the crank shaft 30. Eccentric $E^1$ drives an arm 70 on a rock shaft 71 mounted in suitable bearings longitudinally under the crank shaft. Eccentric $E^2$ drives a rock arm 72 on a rocker sleeve 73 mounted rotatably around shaft 71. Shaft 71 drives the outer sleeves of two valves and the inner sleeves of the other two, while the rocker sleeve 73 drives the inner sleeves of the first mentioned two and the outer sleeves of the latter mentioned pair. For instance, on the end of shaft 71 there is an arm 74, and a connecting rod 75 extends from the end of this arm to the end of a pivoted rocker 76. This rocker 76 is centrally pivoted and its ends are connected by links 77 with the outer sleeves 16 of the pair of cylinders to the right in Fig. 3 and to the left in Fig. 4. (The cylinder shown at the extreme right in Fig. 3 is the one shown in section in Fig. 1.) The cranks 29 of these two cylinders are arranged opposite each other so that the pistons in these cylinders travel in opposite direction. And also it will be seen that the two outer sleeves 16 of the pair of cylinder organizations travel at all times opposite to each other because they are actuated from opposite ends of the rocker 76. Now, with reference to the crank 29 of the cylinder element shown in Fig. 1, the eccentric $E^1$ may have an advance of something less than a quarter of a revolution; so that the outer sleeve of this particular cylinder combination moves up and down slightly in advance of the up and down movement of the pistons. This relationship is true of all the outer sleeves and their respective pistons. The other eccentric $E^2$ is set at a quarter revolution from eccentric $E^1$; the cranks 29 of the two cylinders shown at the left in Fig. 3 and at the right in Fig. 4 being set on quarters with relation to the first mentioned cranks. Eccentric $E^2$ drives the arm 72 and thus drives rocker sleeve 73 which carries an arm 78 connected by connecting rod 79 with rocker 80 which is connected by links 81 to the two outer sleeves 16 at the left in Fig. 3 or at the right in Fig. 4. Now the inner sleeves of the pair of cylinders at the right in Fig. 3 or at the left in Fig. 4 are driven from an arm 82, connecting rod 83, rocker 84 and links 85; and the other pair of inner sleeves 15 is driven through the rock shaft 71, and an arm 86 carried thereby, connecting rod 87, rocker 88 and links 89. It will be seen from this that each cylinder organization has its outer sleeve driven by one eccentric and its inner sleeve driven by the other eccentric. The outer sleeve travels somewhat ahead of the piston movements, reaching the top of its stroke just ahead of the piston and reaching the bottom of its stroke just ahead of the piston. The inner sleeve however travels just behind the pistons, reaching the top of its stroke just behind the top of the piston and reaching the bottom of its stroke just behind the piston stroke. The amount of advance of the outer sleeve movement may in a typical case be $\frac{1}{6}$th and the amount of retard of the other being $\frac{7}{12}$. However it is of course immaterial generally which sleeve is advanced and which is retarded so long as the ports are properly arranged to give proper action.

Beginning with the piston in its uppermost position and assuming that the charge has been compressed in the chamber C and ignited; it then burns and expands and forces the piston down. Assume rotation in the direction indicated in Fig. 1 and Fig. 5 as the piston moves on down and the crank reaches a point about 55° from bottom dead center, the two sleeves are moved down to a point where the exhaust ports $P^3$ and $P^4$ are opened as the piston passes those ports. It will be understood that the piston 17 passes somewhat below the exhaust ports so that the exhaust through sleeve ports 90 and 91 may take place early in the downward stroke of the piston. As the piston moves on downwardly, then the two sleeve ports 92 and 93 register together and register with the air port $P^2$ and air under pressure is forced into the upper part of chamber C from the manifold 35. The air under pressure forces the burning gases out of the cylinder and out through the exhaust ports; and when a layer or strata of fresh air has been laid over the burned gases, then in the further cycle of operation, the sleeve ports 94 and 95 register with charge port $P^1$; and then the charge of combustible mixture begins to enter the upper part of chamber C. This occurs when the piston is near its lowermost point, preferably at a position of the crank about 10° before bottom dead center. The inflow of air and of combustible mixture then continue contemporaneously; so that there is then formed in the cylinder a layer or strata of somewhat thinner mixture than that formed in manifold $45^a$. Then, preferably at about 15° past dead center, ports 92 and 93 move to cut off the port $P^2$ and access of air under pressure is then cut off, but the charge port $P^1$ remains open until a position is reached about 45° past bottom dead center, when the sleeve ports act to close the port $P^1$. Now the exhaust ports $P^3$ and $P^4$ have been closed simultaneously or approximately simultaneously with the closure of air ports $P^2$; and after that closure the charge from port $P^1$ is admitted under pressure into a closed combustion chamber from which there is no further outflow and therefore in which there is no further flow of gases. The action from the time the exhaust closes until the charge port $P^1$ closes is an action of packing the explosive charge into the upper part of the combustion chamber—of creating a super-charge pressure in the combustion chamber and forming a strata of combustible mixture in the upper part of the chamber. This combustible mixture may be abnormally rich, so that the subsequent flame of combustion will propagate comparatively slowly through the remaining body of gas compressed in the chamber; that is, I may have combustion rather than explosion. In such a case the underlying body of air between the mixture and the piston acts more or less as a resilient buffer between the expansion above and the piston below, and then finally acts to complete the latter part of the combustion of the combustible mixture strata above. If the combustible mixture is not abnormally rich and is introduced to form strata and is then ignited; then, just in proportion as the upper stratum forms a perfectly explosive mixture, the air volume below acts as a buffer or cushion. However the usual method of operation partakes of both these operations; the air below providing oxygen for the gradual combustion—the latter part of the combustion—of the fuel, and acting also as a buffer or cushion for the initial expansion. It will be readily understood now how the combustible mixture is introduced in stratified form; because the air is first introduced to fill the combustion chamber and to drive out the burned gases and then the combustible mixture is subsequently introduced, and is introduced at a time when the chamber is otherwise closed so that there is substantially the action of packing the last introduced combustible charge into the upper part only of the cylinder. The chambered head 14 shown in Fig. 1 assists in operation of this kind, causing more or less concentration of the combustible mixture around the spark plug 20. Such a form of head also helps in cleaning the burned gases out of the space immediately next the spark plug, because the first introduced scavenging air is directed up into the chamber and passes through its central restricted opening $14^c$ into the combustion chamber proper.

The swept volumes in the combustion chamber and the compression chambers are equal, the bores and strokes being the same. The combined volumes of gases compressed in chambers $C^1$ and $C^2$ and effectively transmitted to the combustion chamber is substantially in excess of that which normally would fill the combustion chamber; so that when these two volumes are admitted to the combustion chamber the combustion chamber is super-charged. In fact the sequence of valve operation is supposed to be substantially such that the volume of air which is admitted through port $P^2$ from the time the air opens to the time the exhaust and air close, plus the volume of explosive mixture or charge admitted from the time the gas opens to the time the exhaust closes, is substantially equal to or greater than the whole volume of the work cylinder or combustion chamber; so that the burned gases are entirely swept out and displaced by this volume of fresh gases thus admitted up to the time of exhaust closure; and so that the combustible mixture thereafter admitted, up to the time of gas closure, is in the nature of a super-charge. It is to be noted in this connection that the gas compression reaches its highest pressure as the piston reaches its lowermost point of travel; so that when the gas port is opened the gas will be at its highest effective pressure.

The piston moves upwardly and compresses the supercharge, compressing it to a suitable compression pressure (such pressure depending upon the design of the engine). Ignition then takes places in the usual manner and combustion and expansion follow.

The action of the valve ports in the compression chambers $C^1$ and $C^2$ will be readily understood without detailed explanation. The valve ports 100 and 101 control port $P^6$ and close very soon after the position shown in Fig. 1 is reached. As piston 17 moves downwardly the sleeve ports 102 and 103 open the port $P^5$ to allow compression of air into the carbureting manifold 45. Ports 104 and 105 control port $P^7$ opening that port on the down stroke of piston 18; and ports 106 and 107 control port $P^8$ and open that port on the up stroke of piston 18, having just closed as the piston reaches the position shown in Fig. 1.

Having described a preferred form of my invention, I claim:

1. The combination with a cylinder having air and gas intake and exhaust ports, valvular means controlling the admission of air and gas to and from said cylinder, a piston in said cylinder, a crank shaft, means actuated by said crank shaft articulated with said valvular means and said piston adapted for reciprocating said valvular means and piston in timed relation so that exhaust ports open, air ports open, gas ports open, air and exhaust ports close and gas ports close in the order named.

2. The combination of a cylinder having air and gas intake and exhaust ports, a head in said cylinder providing a combustion chamber, a wall in said head partially closing the combustion chamber to the remainder of said cylinder, valvular means controlling the admission of air and gas to and from said cylinder, a piston in said cylinder, a crank shaft, means actuated by said crank shaft articulated with said valvular means and said piston adapted for reciprocating said valvular means and said piston in timed relation so that exhaust ports open, air ports open, gas ports open, air and exhaust ports close, and gas ports close in the order named, the gas ports opening near the bottom dead center of said crank shaft.

3. In an engine, the combination of a cylinder having air and gas intake and exhaust ports, a head in said cylinder providing a combustion chamber, a wall in said head separating said combustion chamber and the remainder of said cylinder except for an opening axially of said cylinder, a piston operatable in said cylinder, valvular means adapted to control the admission and exhaust of air and gas to and from the combustion chamber and said cylinder so that said cylinder has a packed air charge in advance of the gas charge to the combustion chamber of said head.

4. The combination with a cylinder and a piston therein, the cylinder having charge and air intake and exhaust ports, and valve mechanism connected with the piston to operate in timed relation thereto so that the exhaust port opens, the air port opens, the charge port opens, the air and exhaust ports close and the charge port closes in the order named.

5. The combination with a cylinder and a piston therein, the cylinder having charge and air intake and exhaust ports, said intake ports being near the head end of the cylinder, means in the cylinder near the upper end to partially separate that end of the cylinder chamber from the remainder of the cylinder chamber to facilitate stratification of the charge from the air, and valve mechanism connected with the piston to operate in timed relation thereto so that the exhaust port opens, the air port opens, the charge port opens, the air and exhaust ports close and the charge port closes in the order named.

6. The combination with a cylinder and a piston therein, the cylinder having charge and air intake and exhaust ports, said intake ports being near the head end of the cylinder, means in the cylinder near the upper end to partially separate that end of the cylinder chamber from the remainder of the cylinder chamber to facilitate stratification of the charge from the air, a charge compressing mechanism adapted to compress a gaseous combustible charge to the charge intake port, and valve mechanism connected with the piston to operate in timed relation thereto to control the exhaust and intake ports and so that the air intake port is opened and then the charge intake port is subsequently opened to admit a gaseous charge over the air previously admitted.

7. The combination with a cylinder and a piston therein, the cylinder having charge and air intake and exhaust ports, said intake ports being near the head end of the cylinder, means in the cylinder near the upper end to partially separate that end of the cylinder chamber from the remainder of the cylinder chamber to facilitate stratification of the charge from the air, a charge compressing mechanism adapted to compress a gaseous combustible charge to the charge intake port, and valve mechanism connected with the piston to operate in timed relation to control the exhaust and intake ports and so that the air intake port is opened and then the charge intake port is subsequently opened to admit a gaseous charge over the air previously admitted, the exhaust port being closed prior to closing of the charge intake port so that charge is put into the cylinder after movement of gases therefrom has ceased.

8. The combination with a cylinder and a piston therein, the cylinder having charge and air intake and exhaust ports, said intake ports being near the head end of the cylinder, a charge compressing mechanism adapted to compress a gaseous combustible charge to the charge intake port, and valve mechanism connected with the piston to operate in timed relation thereto to control the exhaust and intake ports, and so that the air intake port is opened and then the charge intake port is subsequently opened before the air intake port is closed to admit a gaseous charge along with further air over the air previously admitted.

9. The combination with a cylinder and a piston therein, the cylinder having charge and air intake and exhaust ports, said intake ports being near the head end of the cylinder, a charge compressing mechanism adapted to compress a gaseous combustible charge to the charge intake port, and valve mechanism connected with the piston to operate in timed relation thereto to control the exhaust and intake ports and so that the air intake port is opened and then the charge intake port is subsequently opened before the air intake port is closed to admit a gaseous charge along with further air over the air previously admitted, the exhaust port being closed prior to closing of the charge intake port so that the gaseous charge is put into the cylinder after movement of gases therefrom has ceased.

10. In an engine, the combination of a combustion chamber with air and charge intake and exhaust ports, the air and charge ports being near its head, and coöperating valve means to open the exhaust port and open the air intake port while the exhaust port is open, and then open the charge port and close the exhaust port and allow the charge port to remain open for a period after the exhaust is closed, and close the air intake port after the charge port has been opened.

11. In an engine, the combination of a combustion chamber with air and charge intake and exhaust ports, the air and charge ports being near its head; coöperating valve means to open the exhaust port and open the air intake port while the exhaust port is open, and then open the charge port and close the exhaust port and allow the charge port to remain open for a period after the exhaust is closed, and means to compress air and a combustible charge to the intake ports; so that the combustion chamber is filled with air and charge under pressure.

12. In an engine, the combination of a mechanism including a combustion space, an air compressing means and a charge compressing means, a piston in the combustion space, a valve mechanism adapted to control introduction of compressed air and charge to the combustion space and to control exhaust therefrom, and means connecting the valve mechanism with the piston in timed relation so that the exhaust opens, air inlet opens, charge inlet opens, air inlet and exhaust close and charge inlet closes in the order named with the charge inlet opening near the end of the forward piston movement.

13. The herein described method of operating an internal combustion engine of the piston and cylinder type, embodying opening exhaust at a time somewhat in advance of the piston reaching the end of its forward stroke, then opening admission of air under pressure, then opening admission of gaseous charge under pressure at a time near the end of the forward piston stroke, then closing the exhaust and stopping the admission of air, and lastly stopping the admission of gaseous charge.

14. The herein described method of operating an internal combustion engine having a combustion chamber, embodying opening exhaust from said chamber, introducing scavenging-and-charging air to the chamber to displace burned gases and to fill the chamber substantially to atmospheric pressure, stopping the exhaust and the introduction of such air and introducing to one end of the closed chamber a combustible gaseous charge during a period after the closure of exhaust of such volume and under such pressure as to supercharge the combustion chamber.

15. In an engine, the combination of a mechanism including a combustion space, an air compressing means and a charge compressing means, a piston in the combustion space, a valve mechanism adapted to control introduction of compressed air and charge to the combustion space and to control exhaust therefrom, and means connecting the valve mechanism with the piston to operate in timed relation so that the exhaust opens, air inlet opens, charge inlet opens, air inlet and exhaust close, and charge inlet closes in the order named with the charge inlet opening near the end of the forward piston movement, the combustion space having a wall across its end partially closing that end from the remainder of the space and into which end the air and charge are directed.

16. In an internal combustion engine, an outer cylinder, an inner movable ported cylinder sleeve, a piston in the cylinder sleeve, a head mounted on the outer cylinder and projecting into the cylinder sleeve, said head having a chamber communicating with the interior of the cylinder sleeve over the piston through an opening of less cross sectional area than the chamber in the head and said head having a passage extending past said constricted opening and adapted to be registered with by a port in the movable cylinder sleeve.

17. In an engine, the combination of a combustion chamber with a piston therein, a charge compression chamber with a piston, and an air compression means, the charge compressing and combustion chamber pistons being so connected that the combustion chamber is fully expanded when the charge compressing chamber is fully contracted; and coöperating valve mechanism whereby exhaust from the combustion chamber is opened and compressed air is first admitted to the combustion chamber during its expansion and compressed charge is then admitted to the chamber near the time of its greatest expansion and the time of greatest contraction of the charge compressing chamber, and the exhaust is then closed and the charge admission is lastly closed.

18. In an engine, the combination of a combustion chamber with intake and exhaust ports, independently variable means of charging chamber with fresh air under pressure, and means to subsequently charge the chamber with a gaseous combustible mixture under pressure in quantity independently variable with relation to the quantity of air charge, and the composition of the combustible mixture being variable independently.

19. In an engine, the combination of a combustion chamber with intake and exhaust ports, independently variable means of charging the chamber with fresh air under pressure, and means to subsequently charge the chamber with a gaseous combustible mixture of independently variable quantity and composition, said means embodying means to compress air in variable quantity and means to carburet that air while compressed with a variable quantity of fuel.

20. In an engine, the combination of a combustion cylinder and piston with intake and exhaust ports, independently variable means of charging the chamber with fresh air under pressure embodying a compression cylinder and piston with a swept volume approximately equal to the swept volume of the combustion cylinder, and means to subsequently charge the combustion cylinder with a gaseous combustible mixture under pressure in independently variable quantity and composition, said means embodying controllable means for compressing air and controllable means for carbureting said air.

21. The herein described method of operating an internal combustion engine having a combustion chamber, embodying opening exhaust from said chamber, introducing to the chamber scavenging-and-charging air under independently controllable pressure to displace burned gases and to charge the chamber with air, and then introducing to said chamber a gaseous conbustible charge under independently controllable pressure, the composition of said charge being also independently controllable.

22. The herein described method of operating an internal combustion engine having a combustion chamber, embodying opening exhaust from said chamber, introducing to the chamber scavenging-and-charging air under independently controllable pressure to displace burned gases and to charge the chamber with air, stopping the exhaust and the introduction of said air; and then, during a period after the flow of gases from the chamber is stopped, introducing to the chamber a gaseous combustible charge under independently controllable pressure and of independently controllable composition.

23. In an engine, the combination of a combustion chamber with air and charge intake and exhaust ports; and coöperating valve means to open the exhaust port and open the air intake port while the exhaust port is open, and then open the charge port before closing the air port and close the exhaust port and allow the charge port to remain open for a period after the exhaust is closed; and means to maintain a reduced pressure on the exhaust.

24. In an engine, the combination of a mechanism including a combustion space, an air compressing means and a charge compressing means, a piston in the combustion space, a valve mechanism adapted to control introduction of compressed air and charge to the combustion space and to control exhaust therefrom, and means connecting the valve mechanism with the piston to operate in timed relation so that the exhaust opens, air inlet opens, charge inlet opens, air inlet and exhaust close, and charge inlet closes in the order named with the charge inlet opening near the end of the forward piston movement; and means to maintain a reduced pressure on the exhaust.

25. In an engine, the combination of a mechanism including a combustion space, an air compressing means and a charge compressing means, a piston in the combustion space, a valve mechanism adapted to control introduction of compressed air and charge to the combustion space and to control exhaust therefrom, and means connecting the valve mechanism with the piston to operate in timed relation so that the exhaust opens, air inlet opens, charge inlet opens, air inlet and exhaust close, and charge inlet closes in the order named with the charge inlet opening near the end of the forward piston movement, the combustion space having a wall across its end partially closing that end from the remainder of the space and into which end the air and charge are directed; and means for maintaining a reduced pressure on the exhaust to draw the exhaust gases from the chamber.

26. In an engine, the combination of a mechanism including a combustion chamber, an air compressing means and a charge compressing means, the swept volumes in all the chambers being approximately equal, and the combined swept volumes in the compression chambers being greater than the total volume of the combustion chamber; and valve means to introduce the compressed air and charge to the combustion chamber and exhaust burned gases from said chamber, said valve means admitting compressed air and then admitting charge and cutting off air admission at a time between charge admission and the cutting off charge.

27. In an engine, the combination of a mechanism including a combustion chamber, an air compressing means and a charge compressing means, the swept volumes in all the chambers being approximately equal, and the combined swept volumes in the compression chambers being greater than the total volume of the combustion chamber; and valve means controlling exhaust from the combustion chamber and communication of the compression chambers with the combustion chamber to admit compressed air and charge to the combustion chamber, the valve means acting to open exhaust, open air communication, open charge communication, close exhaust and close air communication, and close charge commuication, in the order named.

In witness that I claim the foregoing I have hereunto subscribed my name this 31st day of August, 1918.

JOHN M. CAGE.

Witnesses:
  LUCRETIA CAGE,
  THOMAS I. BIDDLE.